US00RE35460E

United States Patent [19]

Klungness et al.

[11] E Patent Number: Re. 35,460

[45] Reissued Date of Patent: Feb. 25, 1997

[54] METHOD FOR FIBER LOADING A CHEMICAL COMPOUND

[75] Inventors: John H. Klungness; Daniel F. Caulfield; Irving B. Sachs; Marguerite S. Sykes; Freya Tan, all of Madison; Richard W. Shilts, Stoughton, all of Wis.

[73] Assignee: The United States of America as represented by the Secretary of Agriculture, Washington, D.C.

[21] Appl. No.: 141,181

[22] Filed: Oct. 21, 1993

Related U.S. Patent Documents

Reissue of:

[64] Patent No.: 5,223,090
Issued: Jun. 29, 1993
Appl. No.: 805,025
Filed: Dec. 11, 1991

U.S. Applications:

[63] Continuation-in-part of Ser. No. 665,464, Mar. 6, 1991, abandoned.

[51] Int. Cl.[6] ..... D21H 11/16

[52] U.S. Cl. ..... 162/9; 162/181.2; 162/182; 162/183

[58] Field of Search ..... 162/181.2, 9, 182, 162/183

[56] References Cited

U.S. PATENT DOCUMENTS

| | | | |
|---|---|---|---|
| 5,096,539 | 3/1992 | Allan | 162/181.2 |
| 5,122,230 | 6/1992 | Nakajima | 162/181.2 |

FOREIGN PATENT DOCUMENTS

| | | | |
|---|---|---|---|
| 0457235A1 | 11/1991 | European Pat. Off. . | |
| 62-162098 | 7/1987 | Japan | 162/181.2 |
| 62-199898 | 9/1987 | Japan | 162/181.2 |

*Primary Examiner*—Peter Chin
*Attorney, Agent, or Firm*—Fitch, Even, Tabin & Flannery

[57] ABSTRACT

The present invention relates to a method for loading a chemical compound within the fibers of a fibrous material and to the fibrous materials produced by the method. In the method, a fibrous cellulose material is provided which consists of a plurality of elongated fibers having a fiber wall surrounding a hollow interior. The fibrous material has a moisture content such that the level of water ranges from 40–95% of the weight of the fibrous material and the water is positioned substantially within the hollow interior of the fibers and within the fiber walls of the fibers. A chemical is added to the fibrous material in a manner such that the chemical is disposed in the water present in the fibrous material. The fibrous material is then contacted with a gas which is reactive with the chemical to form a water insoluble chemical compound. The method provides a fibrous material having a chemical compound loaded within the hollow interiors and within the fiber walls of the plurality of fibers.

38 Claims, 7 Drawing Sheets

METHOD FOR FIBER LOADING A CHEMICAL COMPOUND

Matter enclosed in heavy brackets [ ] appears in the original patent but forms no part of this reissue specification; matter printed in italics indicates the additions made by reissue.

RELATED APPLICATION

This application is a continuation-in-part of Application Ser. No. 665,464, filed Mar. 6, 1991 entitled "A Method for Loading a Chemical Compound Within the Hollow Interior of Fibers" now abandoned.

1. Field of the Invention

The present invention relates generally to a method for loading a chemical compound within the hollow interior, cell walls and on the surfaces of the fibers of a fibrous material. More particularly, the present invention is directed to an improved process for the production of filler-containing paper pulp in which the filler is formed in situ while in proximity to the paper pulp and a substantial portion of the filler is disposed in the lumens and cell walls of the cellulose fibers of the paper pulp, to the paper pulp produced thereby and to papers produced from such pulp.

2. Background of the Invention

Paper is a material made from flexible cellulose fibers which, while very short (0.02–0.16 in. or 0.5–4 mm), are about 100 times as long as they are wide. These fibers have a strong attraction for water and for each other; when suspended in water they swell by absorption. When a suspension of a large number of such [§]fibers in water is filtered on a wire screen, the fibers adhere weakly to one another. When more water is removed from the mat formed on the screen by suction and by pressing, the sheet becomes stronger but is still relatively weak. When the sheet is dried, it becomes stronger, and paper is produced.

Any fibrous raw material such as wood, straw, bamboo, hemp, bagasse, sisal, flax, cotton, jute and ramie, can be used in paper manufacture. Separation of the fibers in such materials is called pulping, regardless of the extent of purification involved in the process. The separated fibers are called pulp, whether in suspension in water as a slurry or dewatered to any degree. Pulp from a pulping process which has been dewatered to an extent such that it is no longer a slurry and has been broken up into clumps which appear to have no free water is referred to as "dewatered crumb pulp". While dewatered crumb pulp appears to be particulate fragments, such pulp may contain up to about 95% by weight of water.

Wood is the major source of fiber for pulping because of its wide distribution and its high density compared with other plants. While any species of wood can be used, soft woods are preferred to hard woods because of their longer fibers and absence of vessels. Wood and most other fibrous material have cellulose as their main structural component, along with hemicellulose, lignin and a large number of substances collectively called resins or extractives.

Pulping may be carried out by any of several well known processes, such as mechanical pulping, kraft pulping and sulfite pulping. An essential property of paper for many end uses is its opacity. It is particularly important in papers for printing, where it is desirable that as little as possible of the print on the reverse side of a printed sheet or on a sheet below it be visible through the paper. For printing and other applications, paper must also have a certain degree of whitenss (or brightness as it is know in the paper industry). For many paper products, acceptable levels of these optical properties can be achieved from the pulp fibers alone. However, in other products, the inherent light-reflective powers of the fibers are insufficient to meet consumer demands. In such cases, the papermaker adds a filler to the papermaking furnish.

A filler consists of fine particles of an insoluble solid, usually of a mineral origin. By virtue of the high ratio of surface area to weight (and sometimes high refractive index), the particles confer high light-reflectance to the sheet and thereby increase both opacity and brightness. Enhancement of the optical properties of the paper produced therefrom is the principal object in adding fillers to the furnish although other advantages, such as improved smoothness, improved printability and improved durability, can be imparted to the paper.

The increasing use of alkaline conditions in the manufacture of printing and writing papers has made it technically feasible to incorporate high loadings of alkaline fillers, such as calcium carbonate. There is an economic incentive to increase this filler loading, because when paper is sold on a weight basis (or by the sheet), the cheaper filler material effectively substitutes for the more costly fiber. In Europe, where fiber is more expensive, printing and writing grade papers are commonly produced containing 30–50 percent calcium carbonate; whereas only 15–20 percent loading is typically used in the United States. At the higher levels of filler loading, in order to maintain other [§]desirable paper properties, like strength, it is necessary to use additional expensive chemical additives. In Europe, this added expense is justifiable due to the high cost of fiber. Lower fiber cost in the United States, however, makes the use of chemical additives in order to achieve higher filler substitution less cost effective. Yet, since calcium carbonate is about 20–25% of the cost of a pulp fiber, an economical way to increase the level of pulp substitution by filler remains desirable. However, filler addition does pose some problems.

One problem associated with filler addition is that the mechanical strength of the sheet is less than could be expected from the ratio of load-bearing fiber to non-load-bearing filler. The usual explanation for this is that some of the filler particles become trapped between fibers, thereby reducing the strength of the fiber-to-fiber bonds which are the primary source of paper strength.

A second problem associated with the addition of fillers is that a significant fraction of the small particles drain out with the water during sheet formation on the paper machine. The recovery and recycling of the particles from the drainage water, commonly known as the white water, poses a difficult problem for the papermaker. In seeking to reduce this problem, many researchers have examined the manner in which filler is retained by a sheet. It has become accepted that the main mechanism in co-flocculation, i.e., the adhesion of pigment particles to the fibers. As a result of this finding, major effort in filler technology has gone into increasing the adhesive forces. This work has lead to the development and use of a wide variety of soluble chemical additives known as retention aids. The oldest and the most widely-used of these is aluminum sulfate (Papermakers' alum), but in recent years a variety of proprietary polymers have been introduced. With all of these retention aids, however, retention is still far from complete. A further mechanism of retention is filtration of pigment particles by the paper web. This is relatively important with coarse fillers, but its effect is negligible with fine fillers.

U.S. Pat. No. 4,510,020 to Green, et al. describes a process whereby a particulate filler, such as titanium dioxide, whey or calcium carbonate, is loaded in the lumens of the cellulose fibers of paper pulp. In the method of the Green, et al. patent, the particulate filler is selectively loaded within the fiber lumens by agitating a suspension of pulp and filler until the fiber lumens become loaded with filler. The method requires the use of substantially more particulate filler than can be loaded within the lumens of the fiber. Accordingly, the method requires a step of separating the residual suspended filler from the loaded fibers by vigorously washing the pulp until substantially all of the filler on the external surfaces of the fibers is removed. Thus, the Green, et al. patent does not solve the problem referred to hereinabove wherein the filler must be recovered from the white water.

U.S. Pat. No. 2,583,548 to Craig describes a process for producing a pigmented cellulosic pulp by precipitating pigment in and on and around the fibers. According to the method of the Craig '548 patent, dry cellulosic fibers are added to a solution of calcium chloride. The suspension is mechanically worked so as to effect a gelatinization of the fibers. The proportions of the dry cellulosic stock to the calcium chloride solution can be varied, but in general, the amount of calcium chloride present in the dilute solution is several times the weight of the cellulose fibers which are treated therewith. A second reactant, such as sodium carbonate, is then added so as to effect the precipitation of fine solid particles of calcium carbonate in and on and around the fibers. The fibers are then washed to remove the soluble by-product, which in this case is sodium chloride. The pigmented fibers produced by the Craig '548 patent contain more pigment than cellulose and when used as a paper additive are combined with additional untreated paper pulp. The fibrous form of the pigmented additive provides good retention, but the process does have considerable limitations. The presence of filler on the fiber surfaces and the gelatinizing effect on the fibers are detrimental to paper strength.

A modification of the '548 Craig patent is disclosed in U.S. Pat. No. 2,599,091 to Craig. [in] *In* the method of the Craig '091 patent, dry paper stock containing as high as 13% pulp solids is treated by the addition of solid calcium chloride to the stock. The solid calcium chloride brings about a profound modification of the cellulose fibers after a few minutes of agitation. The fibers become more or less gelatinous and transparent in appearance. After the treatment with calcium chloride, the stock is treated with a soluble carbonate salt in the form of a 10% solution, which is added in sufficient amount to react with the calcium chloride and precipitate an insoluble pigment of calcium carbonate. The resulting treated and pigmented stock is highly hydrated and has little strength or relatively much less strength than the untreated stock. The pigmented stock is then combined with untreated paper stock to provide a pigmented paper stock suitable for the preparation of paper.

U.S. Pat. No. 3,029,181 to Thomsen is a further modification of the in situ precipitation process of the Craig patents. In the method of the Thomsen patent, the fiber is first suspended in a 10% solution of calcium chloride. Thereafter, the fiber is pressed to a moisture content of 50% and is sprayed with a concentrated solution of ammonium carbonate in an amount sufficient to precipitate all the calcium as the carbonate. The fiber is then washed to remove ammonium chloride. The washed fiber is ready for the paper machine and will usually contain approximately 10% of loading material. The Thomsen patent indicates that the method disclosed therein coats the internal area with the loading material and increases the opacity of the cellulose fibers with such internal loading.

Japanese Patent Application 60-297382 to Hokuetsu Seishi describes a method for precipitating calcium carbonate in a slurry of pulp. In the method of the Hokuetsu patent, as set forth in the examples, calcium hydroxide is dispersed in a 1% slurry of beaten or unbeaten pulp. Carbon dioxide gas was then blown into the mixture of pulp slurry and calcium hydroxide to convert the calcium hydroxide to calcium carbonate.

While the Craig patents and the Thomsen patent disclose methods for the precipitation of pigment in the presence of fibers, each of the methods disclosed in these patents requires a washing step to remove the unwanted salt, i.e., sodium chloride or ammonium chloride. These methods also suffer from the aforementioned reduction in paper strength due to the gelatinizing effect on the fibers. The method of the Hokuetsu patent suffers from the fact that the calcium carbonate is precipitated in the aqueous phase of the slurry rather than a crumb pulp and is not substantially present in the lumen and cell walls of the pulp fiber.

Accordingly, it would be highly desirable to provide a method wherein a substantial amount of a filler can be dispersed within the lumens and cell walls of cellulose fibers by a simple method which is adapted to be used with existing papermaking machinery. It would also be highly desirable to provide a method for loading a chemical compound within the hollow interior and cell wall of the fibers of fibrous cellulose materials by a method which obviates the need for a subsequent washing step.

SUMMARY OF THE INVENTION

In a product aspect, the present invention relates to novel fibrous materials comprising a plurality of elongated fibers having a fiber wall surrounding a hollow interior and having a chemical compound loaded within the hollow interior, within the fiber walls of the fibers and on the surface of the fibers.

In process aspects, the present invention relates to a method for producing a chemical compound in situ while in proximity to the fibers of a fibrous material. In the method, a fibrous material is provided which consists of a plurality of elongated fibers having a fiber wall surrounding a hollow interior. The fibrous material has a moisture content such that the level of water ranges from 40–95% of the weight of the fibrous material and the water is positioned substantially within the hollow interior of the fibers and within the fiber walls of the fibers. A chemical is added to the fibrous material in a manner such that the chemical becomes associated with the water present in the fibrous material. The fibrous material is then contacted with a gas which is reactive with the chemical to form a water insoluble chemical compound. The method provides a fibrous material having a chemical compound loaded within the hollow interiors of the fibers, within the fiber walls of the fibers and on the surface of the fibers.

While various aspects of the present invention will be described with more particularity in respect to the loading of paper pulp, it should be understood that the method of the invention is amenable to use with other fibrous materials, which comprise a plurality of elongated fibers having a fiber wall surrounding a hollow interior and which are adapted to have a substantial amount of water dispersed in the hollow interior and fiber walls.

DETAILED DESCRIPTION OF THE INVENTION

Figure 1:
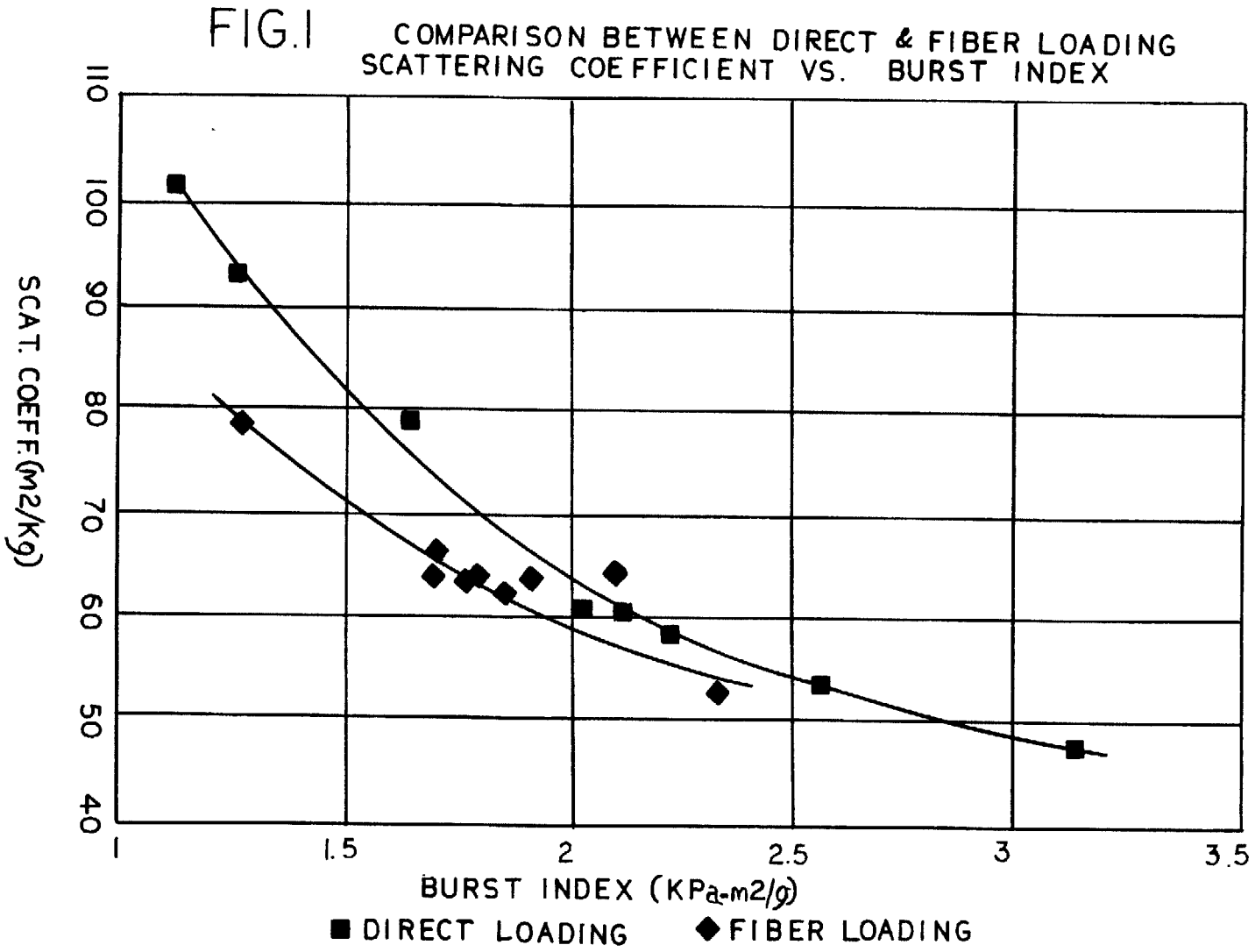
FIG. 1–7 are plots of various parameters of paper handsheets prepared from cellulose loaded with calcium carbonate in accordance with the invention and compared with paper handsheets directly loaded on the surface with calcium carbonate in accordance with a conventional method.
Figure 2:
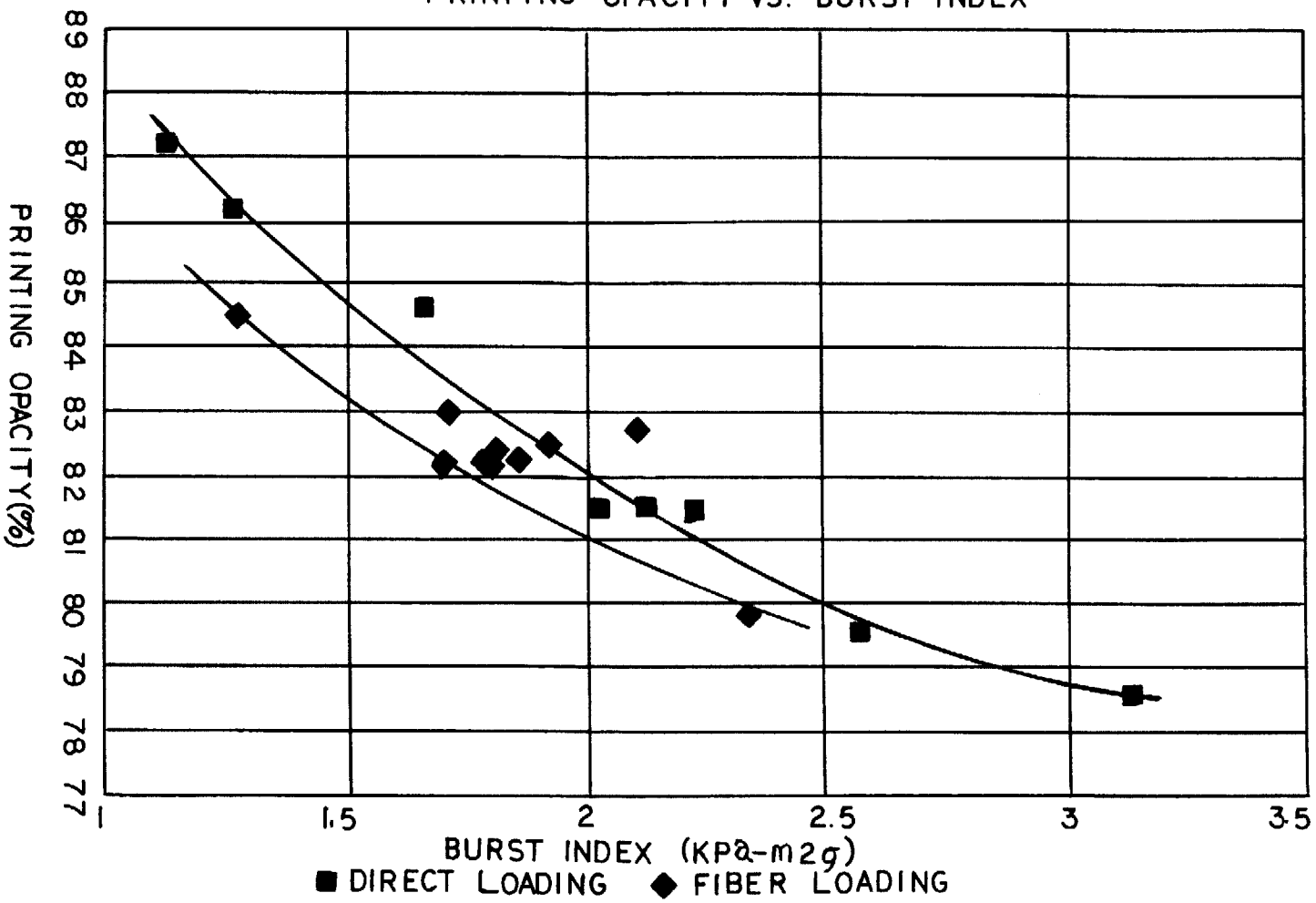
Figure 3:
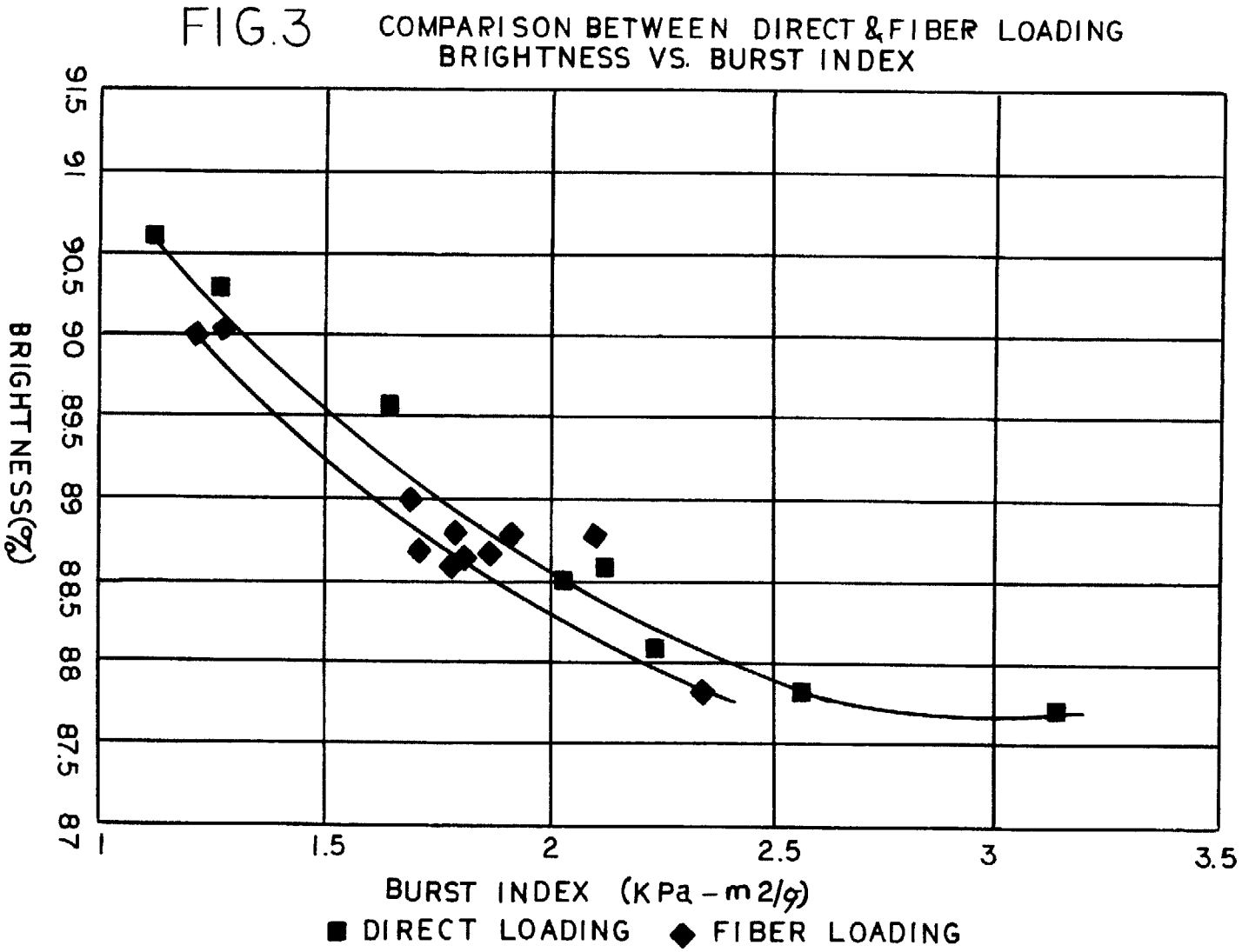

The structure of and physical properties of cellulosic fibers is an important aspect of the present invention. The most widely-used cellulosic fibers for papermaking are those derived from wood. As liberated by the pulping process, the majority of papermaking fibers appear as long hollow tubes, uniform in size for most of the length but tapered at each end. Along the length of the fiber, the fiber wall is perforated by small apertures (pits) which connect the central cavity (lumen) to the fiber exterior. It is well known that papermaking pulp can contain a high level of moisture within the cell wall and interior central cavity or lumen without appearing to be wet or without forming a slurry. An example of such pulp is referred to as "dewatered crumb pulp". The highest level of moisture that can be present in dewatered crumb pulp without providing free moisture on the surface of the pulp is dependent on the type of wood used to produce the pulp, the pulping process used to defiberize the wood and the dewatering method. The level of moisture for a particular pulp at which free water appears on the surface is referred to as the "free moisture level". At levels of moisture above the free moisture level, the pulp fibers become dispersed in the water and slurry is formed. Depending on the type of pulp, the free moisture level of the pulp can be from about 95% to about 90% of moisture, i.e., from about 5% to about 10% of pulp. All percentages used herein are by weight and all temperatures are in degrees Fahrenheit, unless otherwise indicated.

In accordance with the present invention, dewatered crumb pulp is utilized which contains less moisture than the free moisture level. Preferably, the dewatered crumb pulp contains from about 40% to about 95% of moisture, by weight, based on the total weight. In an important embodiment of the invention, it is preferred to use dewatered crumb pulp having from about 70% to about 15% of moisture, i.e., from about 85% to about 30% of cellulose fiber.

The process of the present invention for loading fibers is applicable to a wide range of papermaking fibers. The process can be carried out on pulps derived from many species of wood by any of the common pulping and bleaching procedures. The pulp can enter the process in a "never-dried" dewatered form or it may be reconstituted with water to a level of moisture within the indicated range from a dry state.

Cellulosic fibers of diverse natural origins may be used, including soft wood fibers, hard wood fibers, cotton fibers and fibers from bagasse, hemp and flax. The fibers may be prepared by chemical pulping, however, mechanically pulped fibers, such as ground wood, thermomechanical pulp and chemithermomechanical pulp can also be used. The fibers may have received some mechanical treatment, such as refining or beating prior to loading the chemical compound into the lumen. Synthetic fibers, such as hollow filament rayon, bearing accessible internal hollow structures can also be lumen-loaded by the process of the invention.

Further in accordance with the invention, calcium oxide (lime) or calcium hydroxide is mixed with dewatered crumb pulp having the desired level of moisture. In this connection, the calcium oxide can be added to the water used for reconstituting dried fibers prior to adding the water to the fibers. Upon adding the calcium oxide to a dewatered crumb pulp and simple mixing for a period of a few minutes, the calcium oxide (as a white powder) combines with the water to form calcium hydroxide within the mass of fibers in the pulp. Since both calcium oxide and calcium hydroxide are [both] relatively insoluble in water (1.2 and 1.6 grams per liter, respectively) and there is no substantial free surface moisture on the fibers, the mechanism whereby the calcium oxide is drawn into the water located in the hollow fiber interior and the fiber walls is not completely understood. Calcium oxide, however, reacts vigorously with water in an exothermic reaction to produce calcium hydroxide, enough for 100 grams of quicklime to heat 200 grams of water from 0° F. to boiling. While not wishing to be bound by any theory, it is believed that the calcium oxide reacts with water at the surface openings of the fiber to form calcium hydroxide and that the calcium hydroxide is drawn into the cell walls and hollow interior of the cellulose fibers by hydrostatic forces. For this reason, the highly reactive forms of calcium oxide (quicklime) are preferably used in the process of the invention. The less reactive forms, such as dolomitic limestone and dead burned limestone are less suitable.

The calcium oxide or calcium hydroxide may be added at any desired level up to about 50%, based on the weight of the dry cellulosic material. The lower limit for addition of the calcium oxide may be as low as desired, but is preferably not less than about 0.1%. Most preferably, the calcium oxide or calcium hydroxide is present at a level of from about 10% to about 40%, based on the weight of the dry cellulosic material. The carbon dioxide is added at a level sufficient to cause complete reaction of the chemical with the gas to form the water insoluble chemical compound. Excess gas can be used since no further reaction takes place. Since there is no extraneous chemical material formed, such as would be the case with precipitating a water-insoluble chemical compound with two water soluble salts, there is no need to wash the cellulosic material after treatment with carbon dioxide in accordance with the invention to load the fibers with the precipitated calcium carbonate. In the case of paper pulp, the paper pulp can be immediately transferred to a papermaking operation where it is formed into a slurry, refined and placed onto a Fourdrinier machine or other suitable papermaking apparatus. Alternatively, the paper pulp having the chemical compound loaded therein may be further dried and shipped as an item of commerce to a papermaking facility for subsequent usage.

It has been determined that the precipitation of calcium carbonate in cellulosic fibers containing from about 40% to about 85% of moisture (15% to 60% of fiber) and loaded with from about 10% to about 40% of calcium oxide or calcium hydroxide is easily effected in a pressurized container with low shear mixing. The carbon dioxide pressure in the container is preferably from about 5 psig to about 60 psig and the low shear mixing is preferably continued for a period of from about 1 minute to about 60 minutes.

It has also been determined that for fibers containing from about 95% to about 85% of moisture (5% to 15%[)] of fiber) and the same calcium oxide loading, that high shear treatment during contact with the carbon dioxide is required to cause complete precipitation of calcium carbonate. In this connection, any suitable high shear mixing device can be used. Preferably, the high shear treatment is sufficient to impart from about 10 to about 70 watt hours of energy per kilo of fiber, dry weight basis.

It has been determined that a simple way to provide contact of the carbon dioxide with the paper pulp under high shear treatment is by means of a pressurized refiner. The pressurized refiner is a well known piece of apparatus utilized in the papermaking industry and consists of a cylindrical hopper into which the paper pulp is loaded. The cylindrical hopper is gas tight and can be pressurized with a gas. A rotating shaft containing beater arms is disposed within the hopper to keep the paper pulp from matting. An auger screw is located beneath the hopper for conveying the paper pulp into the interior space between a set of matched discs. One of the discs is stationary whereas the opposing [disk] *disc* is driven by means of a motor. The discs are spaced apart by a distance sufficient to shred the pulp crumbs as the pulp passes between the stationary [disk] *disc* and the revolving [disk] *disc*. The discs may be provided with refining surfaces The use of a "devil's tooth" plate, or fiberizing plate, has also been found to be suitable. Prior to forcing the pulp into contact with the rotating plate, the carbon dioxide is pumped into the sealed hopper to [pressurized] *pressurize* the hopper with carbon dioxide and remains in contact with the pulp while the paper pulp is stirred in the hopper and while the pulp is being transported by the auger through the refiner discs.

It has also been determined that it is not possible to effect the reaction between the calcium oxide or calcium hydroxide and the carbon dioxide by blowing the carbon dioxide through the mixture of dewatered crumb pulp and the calcium oxide or calcium hydroxide.

Through an investigation of handsheets prepared in accordance with the invention, it has been determined that about 50% of the precipitated calcium carbonate is retained by the pulp fibers. The remaining 50% is recovered as white water which can be used to fill paper on the papermaking machine in accordance with conventional surface filling processes. The retained calcium carbonate is distributed approximately equally in the lumen, within the cell walls of the cellulose fibers and on the surface of the cellulose fibers. A higher level of retention is attained by precipitation of calcium carbonate in a pressurized container with low shear than through use of the pressurized refiner. The quality of handsheets prepared from pulp wherein the precipitation is effected with the pressurized refiner is, however, superior.

The following example further illustrates various features of the invention, but is intended to in no way limit the scope of the invention as set forth in the appended claims.

Materials

Pulp—The pulps used were a softwood pulp mixture and a hardwood pulp mixture that were supplied by Consolidated Paper Company and refined further in a single disk refiner to pulp freenesses of 410 and 180 (CSF) for the softwood, and 395 and 290 (CSF) for the hardwood.

Calcium reactants—Calcium oxide used was a technical grade (Fisher Chemical Company) or a high reactivity Continental lime (Marblehead Lime Co.). Reagent grade calcium hydroxide (Aldrich Chemical) was also used. For the direct loading comparison, papermaker grade calcium carbonate (Pfizer) was used.

Equipment

Mixer—A bench-model 3-speed Hobart food mixer with a 20 quart stainless steel bowl and flat beater was used for mixing the calcium reactants with the pulp.

Refiner—A Sprout-Bauer pressurized [disk] *disc* refiner was used as both the reaction chamber and refiner for precipitating calcium carbonate and incorporating it into pulp fibers.

Filtering centrifuge—This 2-speed centrifuge is equipped with a perforated vessel lined with a canvas bag to filter a continuous flow of low consistency slurries.

Bauer-McNett Fiber Analyzer—An industry standard method for determining non-leachable filler retention.

Muffle furnace—A Thermodyne furnace was used for ashing samples.

Typical Refiner Run Procedure

Hobart—For each run, 1 kg pulp (based on dry weight of fiber) was blended in the Hobart mixer with varying amounts of calcium reactant and water required for a specific chemical load and consistency. The pulp was mixed for 15 minutes at low speed (approximately 110 rpm) to uniformly incorporate the calcium.

Refiner—The high consistency pulp was then loaded into the hopper of the refiner which was closed and sealed. Carbon dioxide was injected into the hopper to react with the calcium hydroxide. Carbon dioxide was held in the tank at 20 lbs. pressure for 15 minutes. During this interval, calcium carbonate was precipitated in the pulp fibers by the reaction of calcium oxide or calcium hydroxide with the carbon dioxide. The pulp is then refined in a carbon dioxide atmosphere at the desired plate gap and feed rate to provide intimate contact of the carbonate and fibers.

Direct loading—For comparisons, pulps were loaded directly with calcium carbonate without the aid of the pressurized refiner. Pulp for direct loading was fiberized in the British Disintegrator according to Tappi Standard T-205 for 60g/[m2] $m^2$ handsheet preparation and poured into the doler tank. Varying amounts of calcium carbonate was added to the low consistency pulp slurry in the doler tank and stirred to assure uniform distribution prior to making handsheets.

Centrifuging—In order to avoid the high consistency mixing step using the Hobart mixer, pulps were sometimes loaded with calcium oxide or calcium hydroxide at low consistency and then dewatered. Pulp and the calcium reactant was stirred at 2% consistency with an air stirrer for 15 minutes. The pulp slurry was [the] *then* into the filtering centrifuge to dewater the pulp to approximately 30% consistency. The pulp was removed from the centrifuge bag, shredded and loaded into the pressurized refiner for reaction with carbon dioxide.

TEST MATERIALS

Scanning Electron Microscopy (SEM)—SEM observations and X-ray microanalysis was carried out on transverse sections of pulp fibers and handsheets. Sections were handcut with a razor blade. The dry pulps and strips of handsheets (1 cm×0.3 cm) were cemented to aluminum stubs and sputter-coated with gold. Samples were photographed in JEOL 840 SEM at an accelerating voltage of 20 kv.

SEM X-ray microanalysis—Samples were prepared as for SEM observation, but were adhered to carbon specimen stubs and coated with a conductive carbon layer. X-ray microanalysis was performed with a Tracor Northern T-2000/4000 energy-dispersive spectrometer in combination with the scanning electron microscope. The microanalysis spectra were recorded in an energy range of 15 keV.

The specimen preparation procedures for x-ray analysis make it necessary for controls to be employed if x-ray data are to be compared with any validity. The samples of pulp and handsheets were dried at the same time, under the same conditions. This eliminates variations arising from inconsistencies in procedures. Once a sample is dried, care was taken to keep it free of moisture. The samples were not exposed to room air and not stored in a desiccator with chemical desiccants for fear of elemental contamination. All x-ray data to be compared was obtained with the same specimen current for biological x-ray microanalysis.

Carbonate Test

Pulp and handsheet specimens were placed in 1% aqueous silver nitrate for 30 minutes, rinsed in [§]distilled water and placed in 5% aqueous sodium thiosulfate for 3 minutes and washed in tap water (Van Kossa's method for carbonates). Carbonate groups (calcium) stain black. Rapid spot tests were run on samples to confirm the presence of carbonates.

Pulp/Paper Tests

As each filled pulp sample was discharged from the refiner, a random sample was taken for the determination of freeness, pH and ash content. Ash content of the pulp was assessed by Tappi Method T-211. Handsheets (60g/m$^2$) were prepared from the pulp by standard Tappi Method T-205. Again, the ash content was determined on the handsheet, and the percent retention is reported as the percent filler in the handsheet based on the percent filler in the pulp (and subtracting the small blank of the pulp's original ash content). Percent retention, therefore, represents the filler retention that stays with the pulp during standard handsheet formation. Another sample of pulp from the refiner discharge was subjected to a thorough washing (20 minutes) with tap water in a chamber of a Bauer-McNett fiber fractionator and collected on a 200 mesh screen. The ash content was determined on this Bauer-McNett washed pulp sample, and is identified in the data tables as B/M ash%.

The handsheets were used for evaluation of [§]burst index and for the evaluation of optical properties. Burst index, as determined by Tappi Method T-403, is a convenient measure of strength and an accepted measure of fiber bonding. Densities of the handsheets were measured according to Tappi Method T-220 and appeared to correlate meaningfully with both freeness and burst index. Optical properties of brightness, opacity and scattering coefficient were determined on a Technidyne photometer. Spread sheets of all the test data obtained on the pulp and handsheets are attached in the appendix.

SEM

Initial loading experiments using CaO indicated that rhombohedral calcite crystals in the 1 to 3 micron size were attained, as evidenced by electron microscopy. Scanning electron microscopy of the cross-sections of pulp and handsheet fibers showed that calcium carbonate was precipitated as discrete angular particles, i.e., crystals. Crystalline aggregates can be seen in the lumen and on the surface. The distinctive spectrum of calcium is found within the cell-wall as well as on the fiber surface and in the cell lumen. This latter information indicates that a portion of the calcium ions can diffuse into the fiber wall as well. Calcium carbonate was confirmed to be in the lumen and on the surface of pulp and handsheet fibers.

Table 1 is a comparison of the burst and optical properties (at the same initial freeness) of refiner-run handsheets. The two numbers in parentheses, such as (15,20), indicate the pulp consistency and the calcium reactant loading, respectively. Also for comparison, are the burst and optical properties of handsheets in which the filler loading was obtained by direct addition during handsheet formation of papermaker's grade carbonate (Pfizer). The results in Table 1 are also presented in the FIGS. 1–7. If scattering coefficient, opacity or brightness are plotted versus burst index, FIGS. 1–7 points from the fiber loaded handsheets lie approximately on the same curves as the points from the direct-loaded handsheets. These plots indicate the expected inverse relationship between optical properties and strength; that is, as burst strength increases, the desirable optical properties [decreases] *decrease*. The fact that both fiber loaded handsheets and direct loaded handsheets of the invention lie on the same curves means that for any given gain in optical properties, one would expect a comparable loss in strength properties regardless of how the filler is incorporated.

TABLE 1

COMPARISON OF BURST AND OPTICAL PROPERTIES BETWEEN FIBER LOADED & DIRECT LOADED HANDSHEETS

| Type | Brightness (%) | P. Opacity (%) | Scatt. Coeff. (m$^2$/Kg) | Density (kg · m$^3$) | Burst Index (KPa · m$^2$/g) | Paper Ash (%) | B/M Ash (%) |
|---|---|---|---|---|---|---|---|
| CTRL-Bl.HWC (395) | 87.7 | 78.5 | 47.7 | 717.7 | 3.14 | 0.24 | — |
| 46% D.$CaCO_3$ | 90.6 | 87.2 | 101.6 | 648.4 | 1.12 | 16.25 | — |
| 36% D.$CaCO_3$ | 90.3 | 86.2 | 93.0 | 651.6 | 1.26 | 12.35 | 0.35 |
| **27% D.$CaCO_3$ | 89.6 | 84.6 | 79.6 | 671.7 | 1.65 | 8.80 | 0.35 |
| 16% D.$CaCO_3$ | 88.5 | 81.5 | 60.4 | 676.2 | 2.03 | 4.10 | — |
| 12% D.$CaCO_3$ | 88.1 | 81.5 | 58.2 | 687.2 | 2.23 | 3.02 | — |
| 10% D.$CaCO_3$ | 88.6 | 81.5 | 60.3 | 679.2 | 2.12 | 3.83 | — |
| 5% D.$CaCO_3$ | 87.8 | 79.5 | 53.5 | 696.0 | 2.57 | 1.74 | — |
| Run #214 (21.20) | 89.0 | 82.2 | 64.1 | 722.6 | 1.70 | 9.82 | 4.19 |
| Run #233 (21.20) | 88.8 | 82.5 | 63.9 | 750.8 | 1.92 | 10.48 | 5.34 |
| Run #243 (21.20) | 88.7 | 82.2 | 62.6 | 741.1 | 1.86 | 9.38 | 3.80 |
| Run #245 (21.20) | 88.7 | 82.4 | 64.0 | 738.5 | 1.81 | 9.51 | 3.30 |
| Run #275 (21.20) | 88.6 | 82.2 | 63.1 | 737.1 | 1.78 | 9.16 | 3.34 |
| Run #265 (21.20) | 88.7 | 83.0 | 66.7 | 727.2 | 1.71 | 10.17 | 3.77 |
| Run #213 (18.20) | 88.8 | 82.2 | 64.3 | 736.3 | 1.80 | 10.04 | 3.59 |
| Run #217 (18.30) | 90.0 | 84.5 | 78.9 | 719.2 | 1.27 | 15.39 | 5.22 |
| Run #211 (15.20) | 88.8 | 82.7 | 65.1 | 712.6 | 2.10 | 10.58 | 3.54 |
| Run #218 (18.10) | 87.8 | 79.8 | 53.2 | 720.7 | 2.34 | 5.11 | 2.69 |

Figure 4:
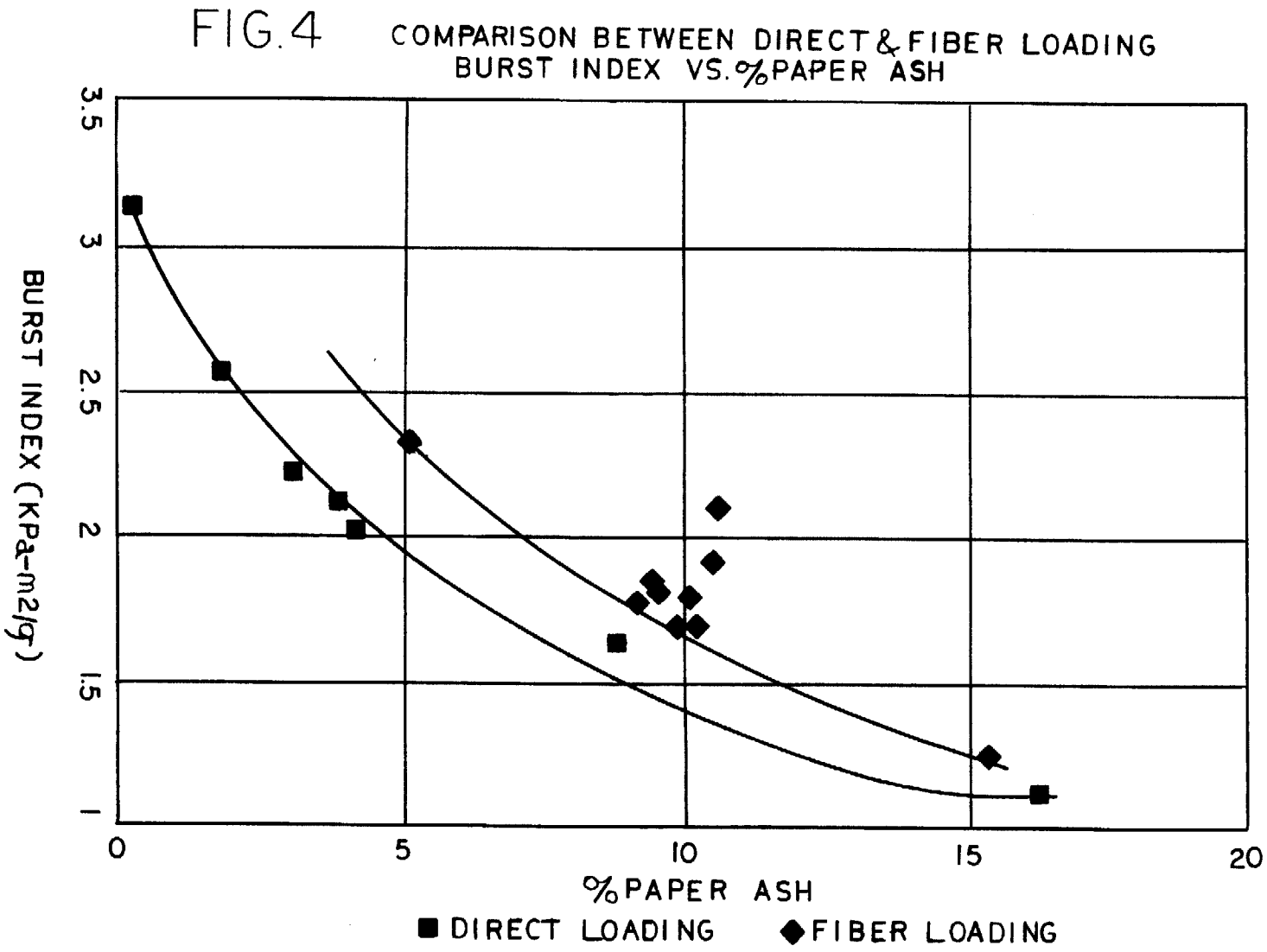
Figure 5:
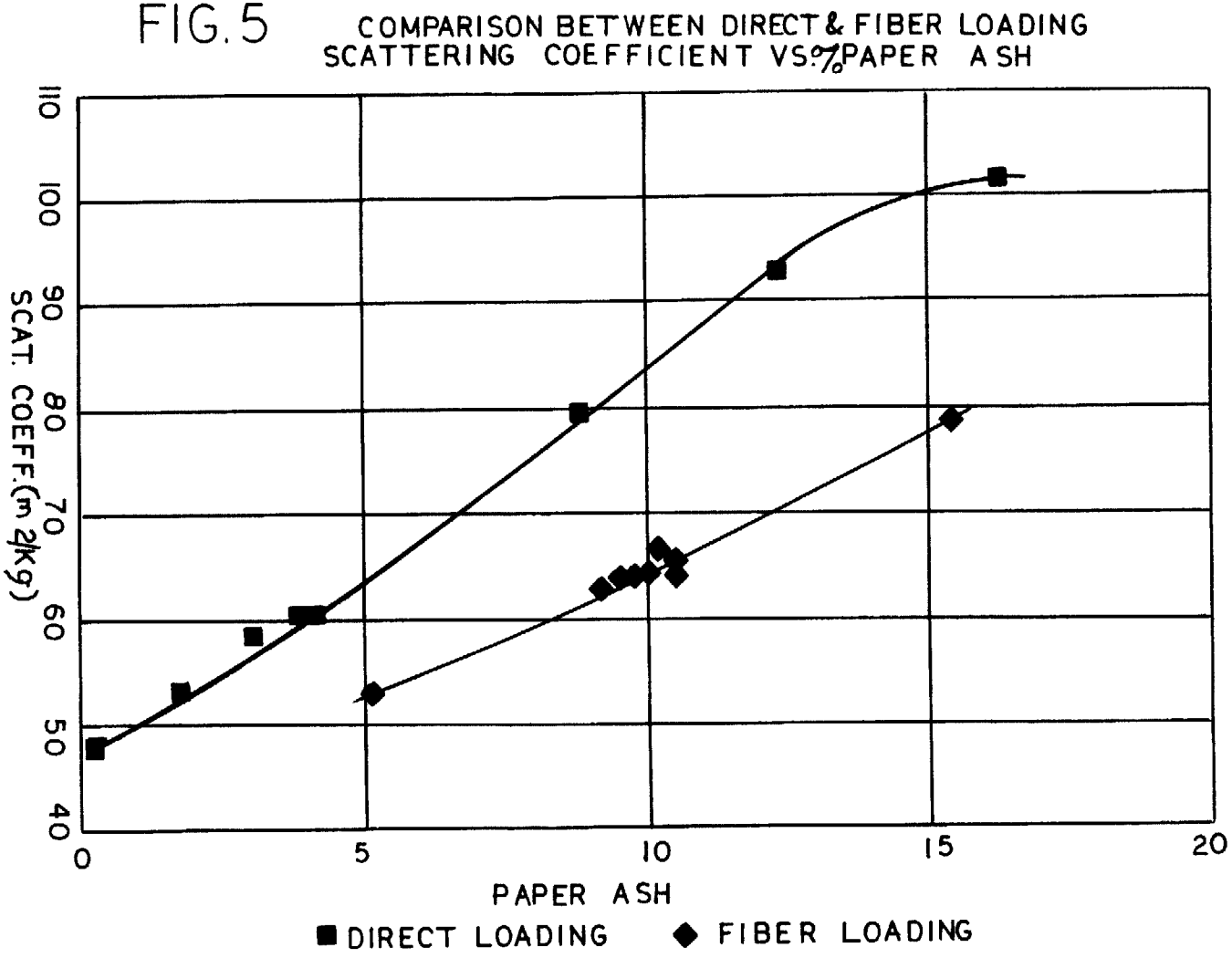
Figure 6:
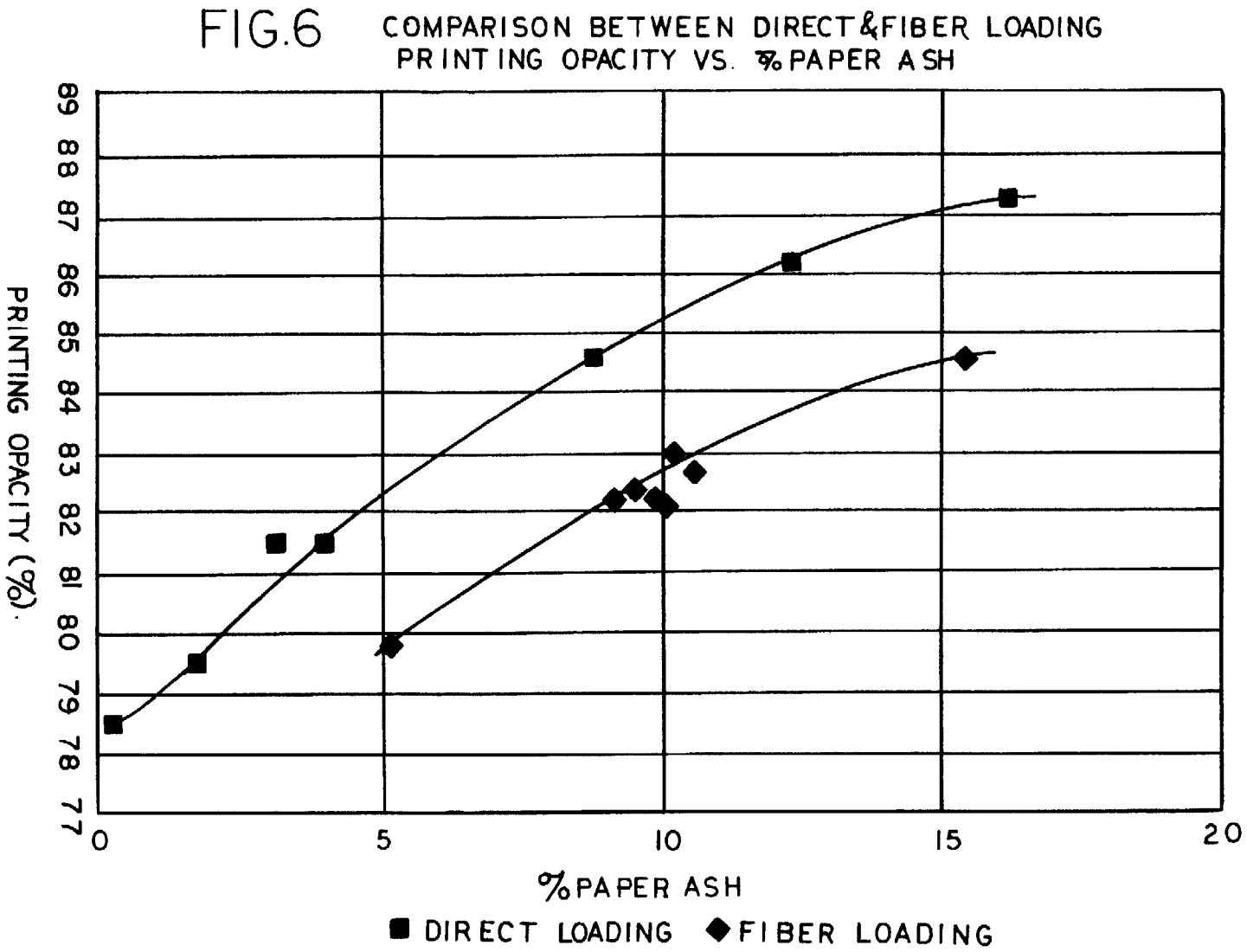
Figure 7:
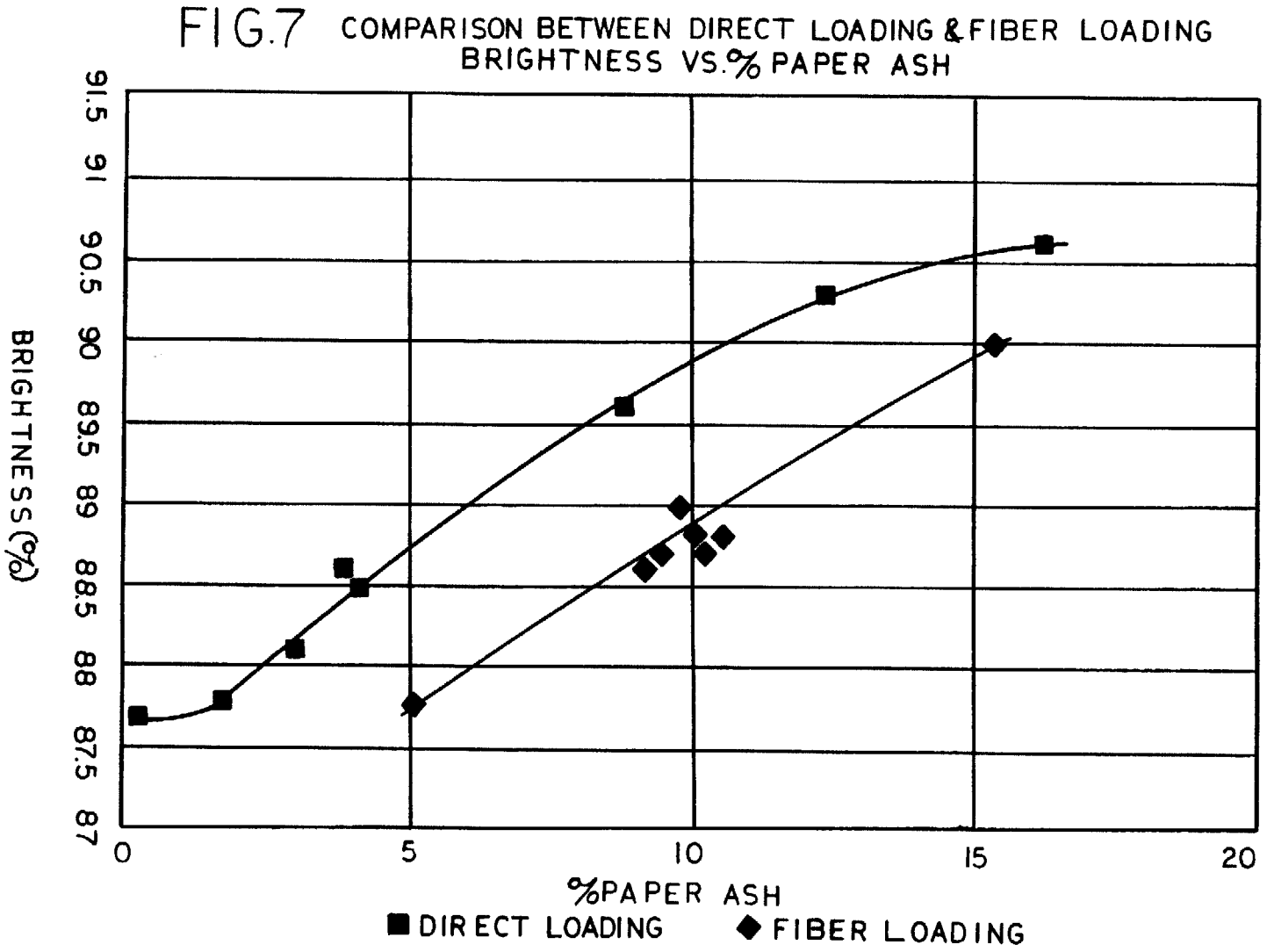

FIG. 4 is a plot of burst index versus ash content. The direct loaded handsheets lie on a smooth curve; again demonstrating that as the ash content increases, the burst strength decreases. The points from the fiber-loaded handsheets are plotted in the same figure and all of the fiber-loaded handsheets lie considerably above the direct-loaded curve. This means that at comparable ash contents, the fiber-loaded [§]handsheets of the invention are considerably stronger. The converse also holds true, as seen in FIGS. 5–7, when optical properties are plotted versus ash content. At equal ash content, the direct-loaded handsheets exhibit better optical properties than the fiber-loaded handsheets of the invention.

Conclusions

It has been demonstrated that fiber loading with calcium carbonate can be accomplished by an in situ reaction between calcium oxide (or hydroxide) and carbon dioxide in high consistency dewatered crumb pulps. A pressurized Sprout-Bauer [disk] *disc* refiner adequately serves as both reaction chamber and as a means for obtaining a good dispersion of filler and fiber. SEM examination has revealed the presence of calcium carbonate crystals on both external fiber surfaces and within the cell lumen; and x-ray microprobe analysis indicates the presence of calcium within the cell wall. Optimum conditions for fiber loading using the pressurized refiner occur at pulp consistency of 18% for softwood pulp and 21% for hardwood pulp.

In some respects, handsheet properties prepared from fiber-loaded pulp [outperformed] *out performed* direct loaded handsheets. When compared at equal filler content and equal freeness, the fiber-loaded handsheet exhibited greater bursting strength. This indicates that comparable burst strength can be obtained at higher ash content for handsheets made from fiber loaded pulp than handsheets made from direct loaded pulp. Also, at the same burst strengths, similar optical properties are obtained. This permits lower cost calcium carbonate to be substituted for higher cost fiber at no loss in burst or optical properties. This is a potential large saving in papermaking costs.

At equal ash contents, the poorer optical properties in comparison to the direct loaded sheet is partly understandable because the papermakers' carbonate was specifically designed in terms of crystal morphology and particle size to achieve maximum scattering power. In addition, filler in close contact with cell-wall material (as for example inside cell lumen) may inherently scatter less because the difference in refractive index between filler and cell-wall material is smaller than the difference in refractive index between filler and air.

We claim:

1. A method for loading cellulosic fibers with calcium carbonate comprising:

(a) providing a cellulosic fibrous material comprising a plurality of elongated fibers having a fiber wall surrounding a hollow-interior, said fibrous material having moisture present at a level sufficient to provide said cellulosic fibrous material in the form of dewatered crumb pulp;

(b) adding a chemical selected from the group consisting of calcium oxide and calcium hydroxide to said pulp in a manner such that at least some of said chemical becomes associated with the water present in said pulp; and (c) contacting said cellulosic fibrous material with carbon dioxide while subjecting said cellulosic fibrous material to [higher] *high* shear mixing so as to provide a cellulosic fibrous material having a substantial amount of calcium carbonate loaded within the hollow interior and within the fiber walls of the plurality of cellulosic fibers.

2. A method in accordance with claim 1 wherein the moisture content of said fibrous material is from about 40% to about 95% by weight.

3. A method in accordance with claim 1 wherein said chemical is added at a level of from about 0.1% to about 50% by weight based on the dry weight of said fibrous material.

4. A method in accordance with claim 1 wherein said chemical is added at a level of from about 5% to about 20% by weight based on the dry weight of said fibrous cellulose material.

5. A method in accordance with claim 1 wherein said contact with carbon dioxide is effected in a closed container pressurized with carbon dioxide gas.

6. A method in accordance with claim 5 wherein said carbon dioxide gas pressure is from about 5 psig to about 60 psig.

7. A method in accordance with claim 5 wherein said carbon dioxide is maintained in contact with said pulp for a period of from about 1 minute to about 60 minutes.

8. A method in accordance with claim 1 wherein said high shear mixing is sufficient to impart from about 10 to about 70 watt hours of energy per kilo of fiber, dry weight basis.

9. A method in accordance with claim 1 wherein said [higher] *high* shear mixing is effected by means of a pressurized paper refiner.

10. A method in accordance with claim 9 wherein said refiner is provided with devil's tooth refining blades.

11. A method for making a filled paper from cellulose fibers having tubular walls and lumens which contain precipitated calcium carbonate comprising:

(a) providing cellulose fibers containing water;

(b) adding a chemical selected from the group consisting of calcium hydroxide and calcium oxide to the cellulose fibers;

(c) contacting said fibers with carbon dioxide gas while subjecting said fibers to high shear mixing so that there is a reaction with the chemical to form precipitated calcium carbonate both in the interior of the fibers and in the fiber walls; and (d) forming paper from said fibers.

12. A method in accordance with claim 11 wherein the water is present at a level of from about 40% to about 95% based on the dry weight of said cellulose fibers.

13. A method in accordance with claim 11 wherein said chemical is added at a level of from about 0.1% to about 50% by weight based on the dry weight of said cellulose fibers.

14. A method in accordance with claim 11 wherein said chemical is added at a level of from about 5% to about 20% by weight based on the dry weight of said cellulose fibers.

15. A method in accordance with claim 11 wherein said contact with carbon dioxide is effected in a closed container pressurized with carbon dioxide gas.

16. A method in accordance with claim 15 wherein said carbon dioxide gas pressure is from about 5 psig to about 60 psig.

17. A method in accordance with claim 15 wherein said carbon dioxide is maintained in contact with said pulp for a period of from about [10 minutes] *1 minute* to about 60 minutes.

18. A method in accordance with claim 11 wherein said high shear mixing is sufficient to impart from about 10 to about 70 watt hours of energy per kilo of fiber, dry weight basis.

19. A method in accordance with claim 11 wherein said high shear mixing is effected by means of a pressurized paper refiner.

20. A method in accordance with claim 19 wherein said refiner is provided with devil's tooth refining blades.

*21. A method for loading cellulosic fibers with calcium carbonate comprising:*

*(a) Providing a cellulosic fibrous material comprising a plurality of elongated fibers having a fiber wall surrounding a hollow interior, said fibrous material containing from about 40% to about 85% moisture, and having the form of dewatered crumb pulp;*

*(b) adding a chemical selected from the group consisting of calcium oxide and calcium hydroxide to said pulp in a manner such that at least some of said chemical becomes associated with the water present in the hollow interior of said pulp said chemical being added at a level of from about 0.1% to about 50% by weight based on the dry weight of said fibrous material; and*

*(c) contacting said cellulosic fibrous material with carbon dioxide so as to provide a cellulosic fibrous material having a substantial amount of calcium carbonate loaded within the hollow interior and within the fiber walls of the plurality of cellulosic fibers, said contact with said carbon dioxide being effected in a closed container pressurized with carbon dioxide gas.*

*22. A method in accordance with claim 21 wherein said chemical is added at a level of from about 5% to about 20% by weight based on the dry weight of said fibrous cellulose material.*

*23. A method in accordance with claim 21 wherein said carbon dioxide gas pressure is from about 5 psig to about 60 psig.*

*24. A method in accordance with claim 21 wherein said carbon dioxide is maintained in contact with said pulp for a period of from about 1 minute to about 60 minutes.*

*25. A method in accordance with claim 21 wherein said contact with carbon dioxide is effected while subjecting said cellulosic material to low shear mixing.*

*26. A method in accordance with claim 21 wherein said cellulosic fibrous material is subjected to high shear mixing after contacting with carbon dioxide.*

*27. A method in accordance with claim 26 wherein said high sheer mixing is sufficient to impart from about 10 to about 70 watt hours of energy per kilo of fiber, dry weight basis.*

*28. A method in accordance with claims 26 wherein said high sheer mixing is effected by means of a pressurized paper refiner.*

*29. A method in accordance with claim 28 wherein said refiner is provided with devil's tooth refining blades.*

*30. A method for making a filler paper from cellulose fibers having tubular walls and lumens which contain precipitated calcium carbonate comprising:*

*(a) providing cellulose fibers containing from about 40% to about 85% moisture;*

*(b) adding a chemical selected from the group consisting of calcium hydroxide and calcium oxide to the cellulose fibers said chemical being added at a level of from about 0.1% to about 50% by weight based on the dry weight of said fibrous material;*

*(c) contacting said fibers with carbon dioxide gas so that there is a reaction with the chemical to form precipitated calcium carbonate in the interior of the fibers, in the fiber walls, and on the surface of the fibers, said contact with said carbon dioxide being effected in a closed container pressurized with carbon dioxide gas; and*

*(d) forming paper from said fibers.*

*31. A method in accordance with claim 30 wherein said chemical is added at a level of from about 5% to about 20% by weight based on the dry weight of said cellulose fibers.*

*32. A method in accordance with claim 30 wherein said carbon dioxide gas pressure is from about 5 psig to about 60 psig.*

*33. A method in accordance with claim 30 wherein said carbon dioxide is maintained in contact with said pulp for a period of from about 1 minute to about 60 minutes.*

*34. A method in accordance with claim 30 wherein said contact with carbon dioxide is effected while subjecting said cellulosic material to low shear mixing.*

*35. A method in accordance with claim 30 wherein said cellulosic fibrous material is subjected to high shear mixing after contacting with carbon dioxide.*

*36. A method in accordance with claims 35 wherein said high shear mixing is sufficient to impart from about 10 to about 70 watt hours of energy per kilo of fiber, dry weight basis.*

*37. A method in accordance with claims 35 wherein said high shear mixing is effected by means of a pressurized paper refiner.*

*38. A method in accordance with claim 37 wherein said refiner is provided with devil's tooth refining blades.*

* * * * *